(12) United States Patent
Suh (10) Patent No.: US 10,479,010 B2
(45) Date of Patent: Nov. 19, 2019

(54) METAL PRODUCT HAVING INTERNAL SPACE FORMED THEREIN AND METHOD OF MANUFACTURING THEREOF

(71) Applicant: INSSTEK, INC., Daejeon (KR)

(72) Inventor: Jeong-Hun Suh, Daejeon (KR)

(73) Assignee: INSSTEK, INC., Daejeon (KR)

( * ) Notice: Subject to any disclaimer, the term of this patent is extended or adjusted under 35 U.S.C. 154(b) by 315 days.

(21) Appl. No.: 15/455,541

(22) Filed: Mar. 10, 2017

(65) Prior Publication Data

US 2017/0225375 A1  Aug. 10, 2017

Related U.S. Application Data

(62) Division of application No. 14/112,964, filed as application No. PCT/KR2012/003323 on Apr. 27, 2012, now Pat. No. 9,636,790.

(30) Foreign Application Priority Data

Apr. 28, 2011  (KR) .......................... 10-2011-0040335

(51) Int. Cl.
*B29C 45/73* (2006.01)
*B33Y 10/00* (2015.01)
(Continued)

(52) U.S. Cl.
CPC .......... *B29C 45/7312* (2013.01); *B21D 37/20* (2013.01); *B22F 3/008* (2013.01); *B22F 3/1055* (2013.01); *B22F 5/10* (2013.01); *B23P 15/007* (2013.01); *B23P 17/00* (2013.01); *B29C 33/3842* (2013.01); *B33Y 10/00* (2014.12); *B33Y 80/00* (2014.12); *Y02P 10/295* (2015.11);
(Continued)

(58) Field of Classification Search
CPC ................................................. B29C 45/7312
See application file for complete search history.

(56) References Cited

U.S. PATENT DOCUMENTS 5,098,514 A  3/1992  Held
5,849,238 A  12/1998  Schmidt et al.
(Continued)

FOREIGN PATENT DOCUMENTS

CN  1030044 A  1/1989
CN  1850396 A  10/2006
(Continued)

OTHER PUBLICATIONS

Office Action dated May 18, 2016 in U.S. Appl. No. 14/112,964.
(Continued)

*Primary Examiner* — Adam Krupicka
(74) *Attorney, Agent, or Firm* — Drinker Biddle & Reath LLP (57) ABSTRACT

There is provided a metal product having an internal space formed therein, allowing for improvements in the flow of a coolant in the internal space, such as a cooling channel and an increase in cooling efficiency, and a method of manufacturing thereof. The metal product includes a body part having a first space formed therein; a space formation member having a second space formed therein, mounted on the body part to be communicated with the first space; and a finishing part forming an exterior by covering the space formation member in a state in which the space formation member is mounted on the body part.

16 Claims, 7 Drawing Sheets

(51) Int. Cl.
  *B33Y 80/00* (2015.01)
  *B22F 3/00* (2006.01)
  *B22F 3/105* (2006.01)
  *B22F 5/10* (2006.01)
  *B23P 15/00* (2006.01)
  *B21D 37/20* (2006.01)
  *B23P 17/00* (2006.01)
  *B29C 33/38* (2006.01)

(52) U.S. Cl.
  CPC ........ *Y10T 29/49826* (2015.01); *Y10T 428/12* (2015.01)

(56) References Cited

U.S. PATENT DOCUMENTS

| | | |
|---|---|---|
| 6,077,067 A | 6/2000 | Gellert |
| 6,079,972 A | 6/2000 | Gellert |
| 6,276,922 B1 | 8/2001 | Huston et al. |
| 7,261,550 B2 | 8/2007 | Herzog |
| 7,323,143 B2 | 1/2008 | Anderson et al. |
| 8,070,473 B2 | 12/2011 | Kozlak |
| 2002/0148590 A1 | 10/2002 | Gellert et al. |
| 2005/0112230 A1 | 5/2005 | Herzog |
| 2011/0064842 A1 | 3/2011 | Chen |
| 2014/0044982 A1 | 2/2014 | Suh |
| 2016/0114506 A1 | 4/2016 | Tabassi et al. |

FOREIGN PATENT DOCUMENTS

| | | |
|---|---|---|
| CN | 101716629 A | 6/2010 |
| CN | 102019652 A | 4/2011 |
| DE | 102006017808 A1 | 10/2007 |
| JP | 62137620 U | 8/1987 |
| JP | 2003103324 A | 4/2003 |
| JP | 2007144457 A | 6/2007 |
| JP | 2010194720 A | 9/2010 |
| KR | 20030039929 A | 5/2003 |
| KR | 1020060104261 | 9/2006 |
| WO | 2007027606 A1 | 3/2007 |

OTHER PUBLICATIONS

Office Action dated Jan. 15, 2016 in U.S. Appl. No. 14/112,964.
International Preliminary Report on Patentability in International Application No. PCT/KR2012/003323 dated Aug. 7, 2013.
Written Opinion and International Search Report in International Application No. PCT/KR2012/003323 dated Nov. 27, 2012.

METAL PRODUCT HAVING INTERNAL SPACE FORMED THEREIN AND METHOD OF MANUFACTURING THEREOF

CROSS-REFERENCE TO RELATED APPLICATIONS

This is a divisional of application Ser. No. 14/112,964, filed Oct. 21, 2013, which is the US National Phase of International Application PCT/KR2012/003323 filed Apr. 27, 2012. The entire disclosures of the above applications are incorporated herein by reference.

FIELD OF THE INVENTION

The present invention relates to a metal product having an internal space formed therein and a method of manufacturing thereof, and more particularly, to a metal product in which an internal space having complicated configuration and geometry is easily formed, and a method of manufacturing thereof. In particular, the present invention relates to a metal product having an internal space formed therein, allowing for improvements in the flow of a coolant (cooling water) in the internal space, such as a cooling channel and an increase in cooling efficiency, and a method of manufacturing thereof. The metal product includes a mold having a cooling channel, and a variety of industrial metal products requiring surface and/or volume cooling (for example, a machine tool and a device having a cooling channel, or the like).

BACKGROUND OF THE INVENTION

The cooling of a mold and a metal product to reduce a surface temperature and/or to obtain the uniform temperature distribution at the surface (or volume) of the mold and the metal product is very important in determining their performance and life time in many cases.

BRIEF SUMMARY OF THE INVENTION

For example, the cooling of injection mold is crucial to the performance of the mold influencing both the rate of the process and the resulting quality of the products produced. In plastic injection molding, the high surface temperature of the mold extends the cycle time to manufacture a plastic product, and the non-uniform temperature distribution at the surface of the mold induces various defects in products such as warpage, thickness variation, and/or a large amount of micro-pores. Meanwhile, the cooling of the injection mold reduces the surface temperature of the mold and uniformalizes the temperature distribution at the surface of the mold, whereby the cooling time and the cycle time required for manufacturing the plastic product is shortened, resulting in an increase in the productivity, as well as improvements in the quality of the plastic products.

However, cooling channel (line) fabrication has been confined to relatively simple configurations, such as straight cooling channel fabricated by gun-drilling, baffle cooling channels, and the like, primarily due to the limits of the conventional metal fabrication methods (including cutting, casting, electrical discharge machining, etc.) used to manufacture the mold and the industrial metal product. Practically, the mold and the metal product with complicated and/or curved cooling channel cannot be made by using the conventional metal fabrication methods because freely manufacturing the configuration and the geometry of the cooling channel is impossible by using the only combination of the straight and the baffle cooling channel made by the conventional metal fabrication methods.

In addition, since the fabrication of the straight cooling channel and the baffle cooling channel does not allow for the formation of a curved channel in which the direction of a coolant is smoothly altered at a turning portion, turbulence or congestion is generated in the coolant flow at a drilling-overlap portion and/or a portion provided with a baffle to thereby lead to extremely low cooling efficiency.

Recently, the emergence of additive fabrication (AF) technologies able to make geometrically complex metal parts and molds directly from 3-dimensional (3D) CAD data has made it possible to produce metal parts and molds with conformal cooling channels that cannot be manufactured by conventional metal fabrication methods.

Figure 1A:
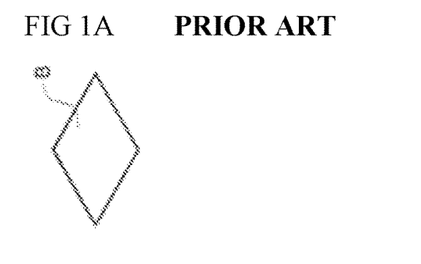
FIGS. 1A through 1D are views sequentially illustrating an operating order of manufacturing a three dimensional (3D)-shaped product using an additive fabrication (AF) technique according to the related art.
Figure 1B:
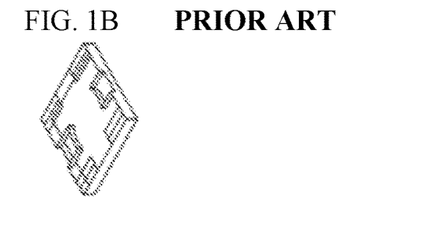
Figure 1C:
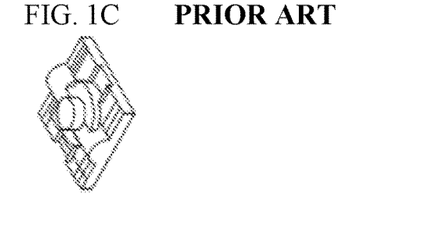
Figure 1D:
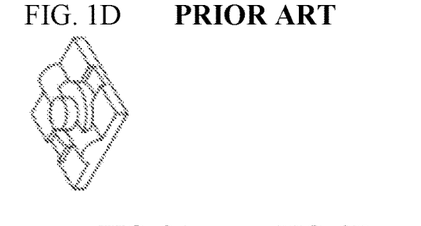
Figure 2A:
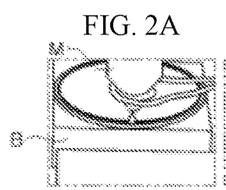
FIGS. 2A through 2F are views sequentially illustrating an operating order of manufacturing a 3D-shaped product using direct metal fabrication (DMF) or multilayer laser cladding techniques according to the related art.
Figure 2B:
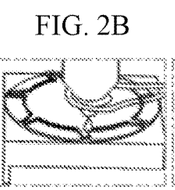
Figure 2C:
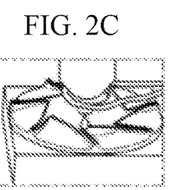
Figure 2D:
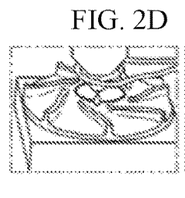
Figure 2E:
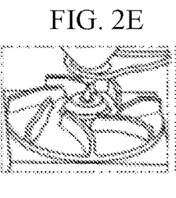
Figure 2F:
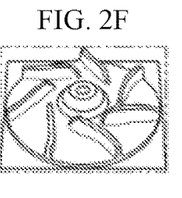

The basic concept of building a 3D object directly from 3D CAD data in the AF technologies is illustrated in FIGS. 1A to 1D. Referring to FIGS. 1A to 1D, the 3D CAD data is divided to get a set of thin layer data (2D cross-sectional information) with a predetermined thickness (or height) and then each successive metal layer corresponding to the 2D cross-sectional information is formed upon a previously formed layer in sequence by using a method of sintering or melting a powdered metal (FIGS. 1A to 1C), producing a 3D metal part (FIG. 1D).

In most of AF technologies, a metal powder is used. According to a method of supplying metal powder in fabricating a 3D metal part, AF technologies can be typically classified into 1), a powder pre-placement method in which metal powder is initially spread at a predetermined thickness before a sintering or melting process is preformed thereupon and 2), an in-situ powder-feeding method in which metal powder is supplied in real time during a build-up process.

The powder pre-placement method 1), among AF technologies, includes a selective laser sintering (SLS) technique and a selective laser melting (SLM) technique (hereinafter, SLS and SLM techniques will be explained as including techniques, such as trademarked DMLS (direct metal laser sintering), LaserCUSING, EBM (electron beam manufacturing), or the like, in this disclosure).

In the SLS and the SLM techniques, metal powder is precisely spread at a predetermined, constant thickness and then a laser beam or electron beam is selectively irradiated onto the layer of metal powder to locally sinter or melt the metal powder, thereby fabricating a two-dimensional metal layer. Then, a series of processes of spreading metal powder at a constant thickness and sintering or melting the metal powder are repeatedly undertaken, upon one another, to thereby manufacture a metal product having a 3D shape.

In particular, the SLS and the SLM techniques are advantageous in terms of the manufacturing of an overhang structure having an empty space therebelow, because metal powder provided below, not irradiated by a laser beam or electron beam, acts as a kind of support in the processes, such that the SLS and the SLM techniques may be theoretically suitable for forming the structure of a cooling channel.

However, the SLS and the SLM techniques have limitations in that a great deal of mold manufacturing costs is incurred due to the use of a relatively expensive special metal powder, water leakage may occur in a manufactured cooling channel due to defects, such as cracks, pores, or the like, a corrosion rate is relatively rapid due to the rough surface of the manufactured cooling channel, a clogging phenomenon has been often reported in the cooling channel, the size of a manufactured product is limited, or the like.

Thus, these techniques have not been widely industrially employed in manufacturing the three-dimensional cooling channel in practice.

Meanwhile, the in-situ powder-feeding method 2), of supplying metal powder in real time, among AF technologies, includes direct metal fabrication (DMF) and multilayer laser cladding techniques, and the like.

As illustrated in FIGS. 2A to 2F, these techniques allow for the formation of a metal product having a 3D shape on the base B by using a forming device M including a laser beam irradiator and a powder feeder.

In the DMF and multilayer laser cladding techniques, a high-powered laser beam is irradiated onto a metal surface of a work piece to form a molten pool of metal into which a precise amount of metal powder is injected in real time. At the same time, by moving the laser beam or (and) work piece along a tool path calculated from 3D CAD data, a metal layer corresponding to a portion of 2D cross-sectional data is formed. Such a process is repeated in sequence, layer-by-layer to thereby manufacture a metal product identical to a 3D CAD model.

The DMF and multilayer laser cladding techniques use commercial metal powders in industry, and result in a fully dense metal product having a fine microstructure due to complete melting and rapid solidification during processing. The metal parts and molds fabricated by the DMF and multilayer laser cladding techniques show excellent mechanical properties equivalent or superior to wrought (or forged) metal in many cases.

In particular, because of supplying the metal powder in real time during the process, the DMF and multilayer laser cladding techniques can form a metal part or 3-dimensional geometry on a 3-dimensional curved surface of metal work piece (or metal substrate), as well as on a 2D flat surface of metal work piece (or metal substrate), unlike the SLS and the SLM techniques can only perform a process on a 2D flat surface.

However, since the DMF and multilayer laser cladding techniques do not include metal powder (or a metal powder layer) acting as a support, unlike the SLS or SLM technique, the manufacturing of an overhang structure having an empty space formed in the lower side thereof is not facilitated.

Accordingly, in order to form the overhang structure (including a cooling channel having the overhang structure) through the DMF and multilayer laser cladding techniques, controlling complex motions of relatively expensive 5-axis equipment is generally required.

There are also alternative methods to allow for producing the overhang structures without the complicated 5-axis motion in the DMF and multilayer laser cladding techniques, such as fabricating a support structure in the process by using an additional metal powder having a low melting point or inserting a flexible copper tube.

In the case of using the additional metal powder having a low melting point to fill an internal empty space of a cooling channel with a support structure or to make a support structure, after a final metal product is fabricated, heating process is necessary for removal of the metal with a low melting point. In this case, there are limitations in that an additional process for manufacturing the cooling channel is required, the surface of the cooling channel can be rather rough, and corrosion (in particular, galvanic corrosion) in the cooling channel can occurs due to metal having a low melting point remaining in the cooling channel without being completely removed.

Figure 3A:
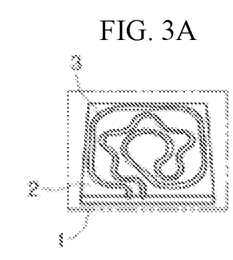
FIGS. 3A through 3D are views sequentially illustrating an operating order of manufacturing a 3D-shaped product having the copper tube inserted thereinto so as to form a cooling channel and using the DMF or multilayer laser cladding techniques according to the related art.
Figure 3B:
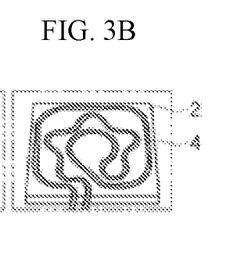
Figure 3C:
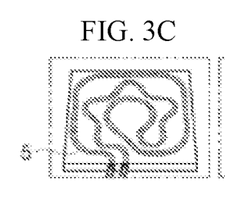
Figure 3D:
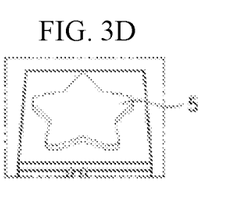

In the method of inserting the flexible copper tube in order to form the cooling channel, as illustrated in FIGS. 3A through 3D, a primary metal product 2 is first fabricated using the DMF or multilayer laser cladding techniques such that a mounting groove 3 is provided in a base 1 (FIG. 3A), and then the copper tube 4 is inserted into the mounting groove 3 (FIG. 3B). By continuously using the DMF or multilayer laser cladding techniques, metal layers 5 are repeatedly formed on the copper tube 4 (FIG. 3C), and then a final metal product having the copper tube 4 inserted thereinto is formed (FIG. 3D).

The method of inserting the copper tube illustrated in FIGS. 3A through 3D has advantages, such as simplicity of manufacturing, smooth surfaces, and high corrosion resistance in the cooling channel; however, it has also disadvantages, such as a reduction in cooling efficiency, because an upper portion of the inserted copper tube 4 forms a complete metallic bond with the metal layers 5 (or the metal product) deposited on it, while a lower portion of the copper tube 4 installed in the mounting groove 3 is separated from the metal product and is not bonded thereto.

In particular, in the case of sharply bending the copper tube 4 in order to form a complex and curved cooling channel, uneven cross-sections in bent portions of the copper tube 4 can be formed, resulting in the occurrence of turbulence in a coolant flow within the copper tube in the event of excessive bending of the copper tube.

Further, since the mounting groove 3 has a cross section corresponding to an only half circle of the copper tube 4, the copper tube 4 is not completely in contact with the cross section of the mounting groove 3 and tends to lift from the mounting groove 3. When the cooling channel has a complex flexion as illustrated in FIGS. 3A through 3D, the magnitude of this phenomenon is increased. Further, when the copper tube 4 is installed along a 3D cooling channel, the lifting phenomenon becomes evident.

In this manner, in the case of the occurrence of the lifting phenomenon, there are many difficulties in manufacturing an upper portion of a final metal product on the copper tube 4 through the DMF and multilayer laser cladding techniques. That is, while the DMF and multilayer laser cladding techniques allow for the deposition of a metal layer corresponding to a 2D cross-section along a path calculated from 3D CAD data, the configuration of the path calculated from 3D CAD data and the actual configuration of the copper tube 4 are different at the location of the occurrence of the lifting phenomenon to thereby cause difficulties in the attainment of a perfect molding.

Ultimately, a method of forming a 3D cooling channel (or an internal space), different from the method of forming a 3D cooling channel by using the AF technologies according to the related art, is required.

DISCLOSURE OF INVENTION

Technical Problem

An aspect of the present invention provides a metal product having an internal space formed therein and a method of manufacturing thereof, allowing for ease in the formation of the metal product (including a mold) having the internal space of a complex configuration.

An aspect of the present invention also provides a metal product having an internal space formed therein and a method of manufacturing thereof, allowing for the easy manufacturing of the internal space (including a cooling channel), the direct fabrication of which is difficult through direct metal fabrication (DMF) and multilayer laser cladding techniques without relatively complicated 5-axis motion, for example, a curvature portion in which a coolant flow is diverted, and an overhang portion having an empty space formed therebelow.

An aspect of the present invention also provides a metal product having an internal space formed therein, in which cooling efficiency is excellent, and a method of manufacturing thereof.

An aspect of the present invention also provides a metal product having an internal space formed therein, in which corrosion resistance is superior, and a method of manufacturing thereof.

Solution to Problem

According to an aspect of the present invention, there is provided a metal product having an internal space formed therein, the metal product including: a body part having a first space formed therein; a space formation member having a second space formed therein, mounted on the body part to be communicated with the first space of body part to form the internal space therein; and a finishing part forming an exterior by covering the space formation member in a state in which the space formation member is mounted on the body part.

The body part may include a mounting groove having the space formation member mounted therein, and the space formation member may have only a part thereof mounted in the mounting groove and a remaining part thereof exposed outwardly of the body part. Unlike this, the body part may include a mounting groove having the space formation member mounted therein, and the space formation member may not be exposed outwardly of the mounting groove.

The space formation member may be made as a single member having the second space formed therein. Alternatively, the space formation member may consist of more than two separation members, and may have the second space formed therein by the coupling of the more than two separation members.

The space formation member may have the second space formed in a lower portion thereof and in communication with the first space of body part to form the internal space, to thereby form an overhang structure having an empty space formed therebelow.

The metal product may be a mold or a variety of metal products requiring cooling, the space formation member may be made of a metallic material, and the first space and the second space may be a cooling channel. The space formation member may form a curvature portion in which a direction of the cooling channel is altered, or an overhang portion having an empty space formed in a lower side in the cooling channel.

Meanwhile, the space formation member may be made of a material identical to that of the body part or a material having corrosion resistance higher than the body part.

The finishing part may be built up to be metallically bonded to the body part and the space formation member, allowing the final metal product to have the internal space formed therein.

According to another aspect of the present invention, there is provided a method of manufacturing a metal product having an internal space formed therein, the method including: preparing a body part having a first space formed therein; preparing a space formation member made of a metallic material and having a second space formed therein, the second space being in communication with the first space; mounting the space formation member on the body part such that the first space and the second space are in communication with each other; and forming a finishing part corresponding to an exterior of the metal product by covering the space formation member.

The first space of the body part may include a rectilinear portion, the rectilinear portion being formed by drilling, the second space of the space formation member may include a curved portion, the curved portion being formed by any one of cutting, casting, and AF processing, or any combination thereof.

The body part and the space formation member may be formed by any one of cutting, casting, and AF processing, or any combination thereof, and the rectilinear portion of the first space of the body part may be formed by drilling.

The finishing part may be metallically bonded to the body part and the space formation member.

The finishing part may be formed by a direct metal fabrication (DMF) technique or a multilayer laser cladding technique. Unlike this, the finishing part may be formed by any one of a SLS technique, a SLM technique, welding, plating, depositing, and thermal spraying.

The space formation member may be formed by coupling at least two separation members, and have the second space formed therein by coupling the at least two separation members, and the method may further include bonding a boundary part of the at least two separation members, before or after mounting the space formation member in a mounting groove formed in the body part.

Meanwhile, the metal product may be a mold or a variety of metal products requiring cooling, and the first space and the second space may be a cooling channel.

The space formation member may form a curvature portion in which a direction of the cooling channel is altered, or an overhang portion having an empty space formed in a lower side in the cooling channel.

Advantageous Effects of Invention

As set forth above, according to embodiments of the present invention, the internal space (the first space) of the body part is formed through simple machining such as drilling, a complex-shaped internal space (the second space) is separately fabricated as the space formation member, and the finishing part forms the exterior of the metal product by covering the first space and the second space, whereby an internal space having a complex configuration can be easily obtained. In particular, according to embodiments of the present invention, the rectilinear portion of the body part forming the first space is formed by drilling, the second space including the curved portion is formed by a conventional manufacturing process (for example, cutting, casting, or the like), AF processing (DMF processing, multilayer laser cladding processing, or the like), or any combination of processing processes thereof, and the first space and the second space are coupled to be thereby allow for easy formation of the internal space having a complex configuration. Therefore, according to embodiments of the present invention, time and costs required for manufacturing the metal product (a mold) can be reduced.

According to embodiments of the present invention, since the cross-sectional dimension of the internal space is made uniform and the direction of a coolant is smoothly altered along a curved surface of the internal space in a state in which turbulence or congestion is not generated in the coolant flow, and therefore cooling efficiency of the metal product can be improved. In particular, an internal space (a cooling channel) having a complex configuration can be formed so as to allow for a uniform temperature at the surface of the metal product. Through this, improvements in the performance of a finished product manufactured using the metal product can be expected.

According to embodiments of the present invention, since the internal space (a cooling channel), the direct fabrication of which is difficult only through the DMF or multilayer laser cladding technique according to the related art, can be fabricated as the space formation member, the internal space having a complex configuration (for example, a curvature portion and/or an overhang structure) can be fabricated without complex controlling of 5-axis equipment.

In addition, in the case of using additional metal powder having a low-melting point according to the related art, the surface of the internal space (a cooling channel) is rather rough, and corrosion (in particular, galvanic corrosion) in the cooling channel occurs in the event of the metal with a low-melting point remaining in the cooling channel without being completely removed. However, according to embodiments of the present invention, the surface of the channel is smooth to thereby allow for low passage resistance and less corrosion.

In addition, in the case of forming the internal space (a cooling channel) by using a copper tube according to the related art, there are disadvantages, such as uneven cross-sections at bent portions of the copper tube. Further, according to the related art, only approximately a half of the cross-sectional area of the copper tube is coupled to the body part, whereby cooling efficiency is rather reduced. However, according to embodiments of the present invention, since the cross-section of the internal space is uniform and the direction of a coolant is smoothly altered along the curved surface of the internal space, turbulence or congestion is not generated in the coolant flow. In addition, according to embodiments of the present invention, the majority of the surface of the space formation member is entirely metallically bonded to the body part or the finishing part to thereby allow for superior cooling efficiency. Furthermore, according to embodiments of the present invention, a 3D internal space can be efficiently fabricated by using a plurality of space formation members.

Further, according to embodiments of the present invention, the space formation member is stably mounted in the mounting groove, whereby metallic bonding between the space formation member and the finishing part and/or the body part can be stably undertaken at the time of performing AF processing, such as subsequent DMF or multilayer laser cladding processes.

In addition, according to embodiments of the present invention, the finishing part may be formed by using DMF or multilayer laser cladding technique, such that metallic bonding between the finishing part and the space formation member and/or the body part can be entirely formed to thereby allow for sufficient achievement of cooling efficiency.

Moreover, according to embodiments of the present invention, the space formation member may be made of a material identical to that of the body part or having corrosion resistance higher than the body part, such that a metal product having superior corrosion resistance can be obtained.

Furthermore, according to embodiments of the present invention, in the case of dividing the space formation member into a plurality of divided separation members, a complex-shaped internal space can be formed in the space formation member. Also, according to embodiments of the present invention, in the case of using a plurality of space formation members, the cooling channel capable of allowing for excellent cooling efficiency even in the metal product having a complex configuration can be fabricated.

DETAILED DESCRIPTION OF THE INVENTION

Mode for the Invention

Terms used in the specification are merely used for the explanation of specific embodiments according to the present invention, and are not intended to limit the scope of the present invention. In addition, a singular expression may include a plural expression in the specification.

Hereinafter, embodiments of the present invention will now be described in detail with reference to the accompanying drawings.

Figures 5A, 5B, 5C:
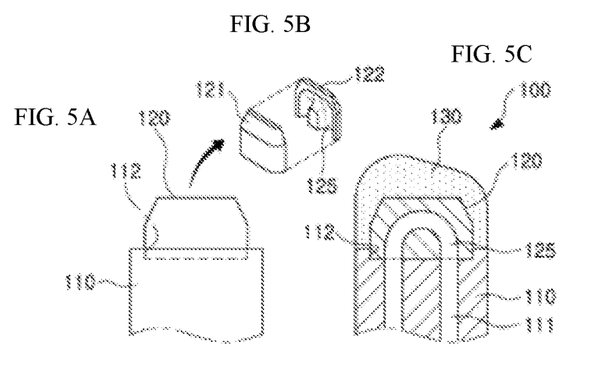
FIGS. 5A and 5C are frontal and cross-sectional views illustrating an embodiment of the metal product according to the present invention.
FIG. 5B illustrates a space-formation member of the metal product.
Figures 5D, 5E, 5F:
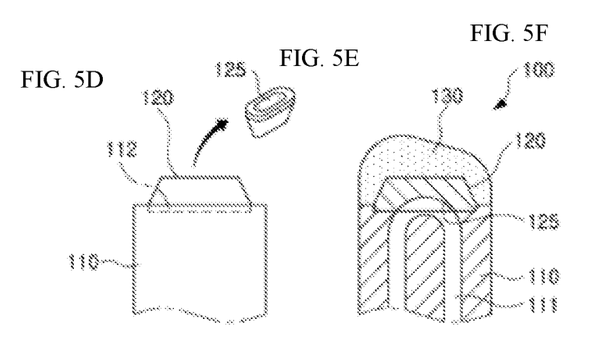
FIGS. 5D and 5F are frontal and cross-sectional views illustrating an embodiment of the metal product according to the present invention.
FIG. 5E illustrates another space-formation member of the metal product.
Figure 6A:
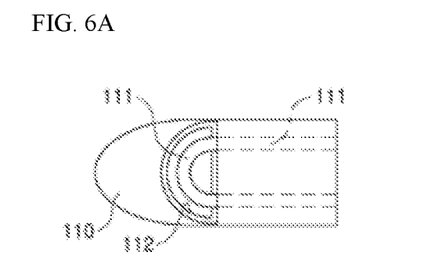
FIGS. 6A, 6B, and 6C are respectively, a plan view, a cross-sectional view, and a front view illustrating another embodiment of the metal product according to the present invention.
Figure 6B:
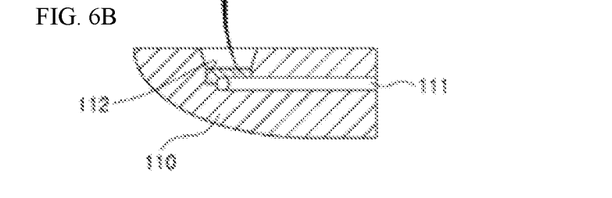
Figure 6C:
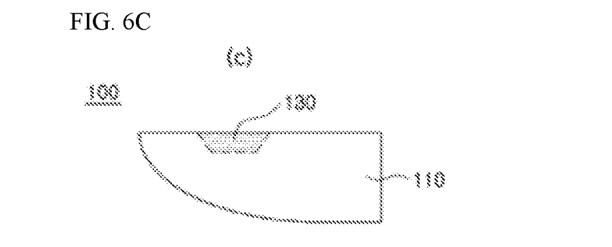
Figures 7A, 7B:
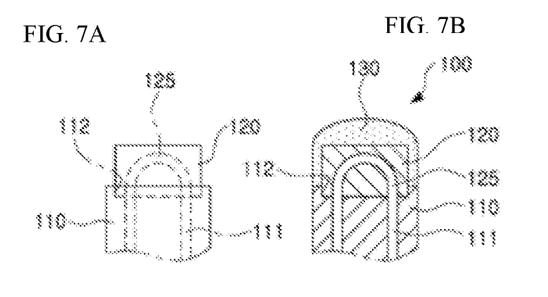
FIGS. 7A and 7B are frontal and cross-sectional views illustrating another embodiment of the metal product according to the present invention.
Figures 7C, 7D:
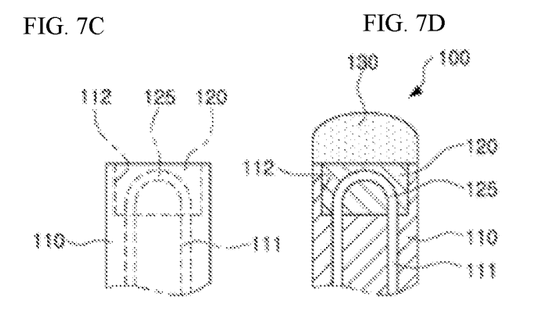
FIGS. 7C and 7D are frontal and cross-sectional views illustrating another embodiment of the metal product according to the present invention.
Figure 8A:
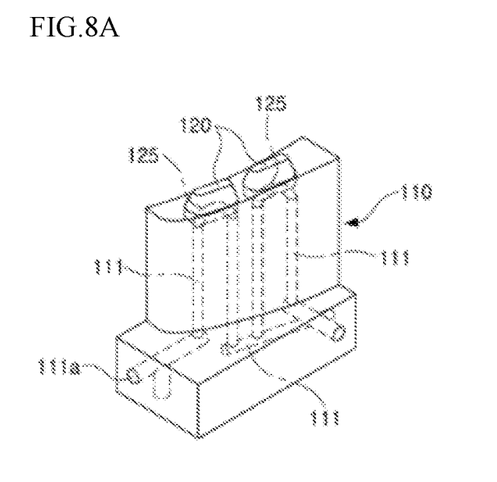
FIGS. 8A and 8B are perspective views illustrating another example of the metal product after the installation of a space forming part and after the formation of a finishing part according to an embodiment of the present invention, respectively.
Figure 8B:
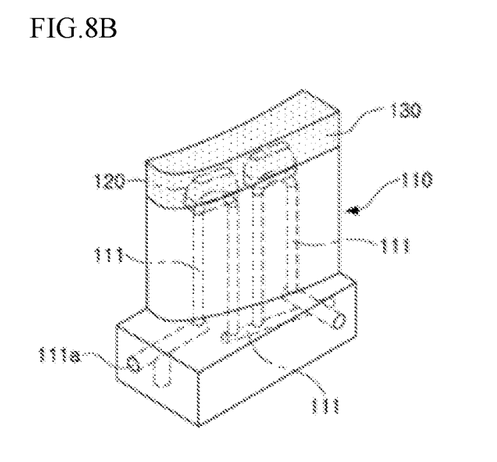

FIGS. 4A through 4F are schematic perspective views sequentially illustrating a process of manufacturing a metal product according to an embodiment of the present invention. FIGS. 5A through 5F are views illustrating various embodiments of the metal product according to the present invention, each having a front view (FIGS. 5A and 5D) and a cross-sectional view (FIGS. 5C and 5F). FIGS. 6A, 6B, and 6C are respectively, a plan view, a cross-sectional view, and a front view illustrating another embodiment of the metal product according to the present invention. FIGS. 7A through 7D are views illustrating another embodiment of the metal product according to the present invention, each having a front view (FIGS. 7A and 7C) and a cross-sectional view (FIGS. 7B and 7D). FIGS. 8A and 8B are perspective views illustrating another embodiment of the metal product after the installation of a space forming part and after the formation of a finishing part according to an embodiment of the present invention, respectively.

The invention may, however, be embodied in many different forms and should not be construed as being limited to the embodiments illustrated in the drawings. In particular, while FIGS. 4 through 8 illustrate and explain a metal product having a simple and plain shape for convenience of explanation, the metal product having an internal space formed therein according to the present invention is not to be construed as being limited to having a simple and plain shape, and a variety of products having complex-shaped internal spaces or exteriors may be employed. Also, detail descriptions with regard to elements, which may obscure the substance of the present invention, will be omitted for clarity. The same or equivalent elements are referred to by the same reference numerals throughout the specification.

As illustrated in FIGS. 4 through 8, the present invention is characterized by manufacturing of a metal product (in particular, a mold) having a complex internal space. A body part 110, corresponding to a part of a metal product, the internal space of which has a rectilinear or simple configuration, is formed by a conventional manufacturing process (for example, cutting, casting, or the like), AF processing (direct metal fabrication (DMF) processing, multilayer laser cladding processing, or the like), or any combination of processing processes thereof, and then the internal space of the body part 110 may be formed through a simple operation, such as drilling. Another part of a metal product, the internal space of which has a curved or complex configuration, is formed as a space forming member 120 and then the body part 110 and the space forming member 120 are coupled. A finishing part 130 corresponding to the remaining exterior of a metal product 100, other than the body part 110, is formed thereon. As a result, a metal product (in particular, a mold) having a complex internal space can be formed.

Referring to FIGS. 4A through 4F, the metal product 100 having an internal space formed therein and a method of manufacturing thereof will be explained.

First, as illustrated in FIGS. 4A through 4F, the metal product 100 having an internal space formed therein according to an embodiment of the present invention includes the body part 110 having a first space 111 formed therein, the space forming member 120 having a second space 125 connected to the first space 111 formed in the body part 110, and the finishing part 130 covering the space forming member 120 and forming the exterior of the metal product 100.

The metal product 100 according to the embodiment of the present invention may be a mold or a variety of metal products requiring surface and/or volume cooling (for example, a machine tool and a device having a cooling channel, or the like), and the use or the shape of the metal product 100 is not particularly limited as long as it has an internal space formed therein.

For convenience of explanation, the metal product 100 functioning as a mold and the internal space used as a cooling channel will be mainly described by way of example.

The body part 110 constituting the majority of the metal product 100 has the first space 111 formed therein.

The body part 110 is formed by a conventional manufacturing process (for example, cutting, casting, or the like), AF processing (DMF processing, multilayer laser cladding processing, or the like), or any combination of processing processes thereof, and has the first space 111 formed therein, such as a cooling channel.

In this case, the first space 111 formed in the body part 110 may have a rectilinear figure or a simple shape, and may be formed through simple machining, such as drilling.

Therefore, the body part 110 constituting the majority of the metal product 100 can be easily formed by a conventional manufacturing process or AF processing, and the first space 111 can be formed easily therein through simple processing. As a result, the manufacturing of the body part 110 can be facilitated, thereby leading to a reduction in manufacturing costs and time.

In particular, in the metal product 100, an overhang structure or a portion in which the direction of a fluid flow is altered can be formed as the space formation member 120 as described later. Therefore, since the body part 110 does not include the overhang structure, the body part 110 having the first space 111 formed therein can be manufactured through an AF technique, such as a DMF technique, a multilayer laser cladding technique, or the like.

In addition, as illustrated in FIGS. 4A through 4F, the body part 110 has a mounting groove 112 in which the space formation member 120 is mounted. The mounting groove 112 has a size approximately the same as that of the space formation member 120 such that at least part of the space formation member 120 can be mounted and fixed therein. By way of example, the space formation member 120 can be press-fittedly inserted into the mounting groove 112 through the use of a rubber mallet or the like, so as to maintain contact with the body part 110. However, the body part 110 may do not have the mounting groove 112, and in this case, a contact portion between the second space 125 and the first space 111 may be bonded by using a welding method, a DMF technique, a multilayer laser cladding technique, or the like in a state in which the second space 125 and the first space 111 are connected.

In addition, as the mounting groove 112 is exposed to the surface of the body part 110, the mounting groove 112 can be easily formed through simple cutting.

Furthermore, the space formation member 120 may have the second space 125 formed therein and connected to the first space 111 formed in the body part 110, and may be mounted in the mounting groove 112 of the body 110.

In this case, the second space 125 may have a cross-sectional area and a cross-sectional shape identical to those of the first space 111, in order to minimize passage resistance applied to a coolant flowing through the first space 111 and the second space 125. In addition, all of the first space 111 and the second space 125 may have a circular cross-sectional structure.

As illustrated in FIGS. 4A through 4F, the space formation member 120 may be formed by coupling at least two separation members 121 and 122 and has the second space 125 formed therein by coupling the separation members 121 and 122.

In this manner, when the space formation member 120 is formed to be divided into a plurality of portions, the second space 125 having a complex shape can be manufactured. That is, when the space formation member 120 is formed to be divided into a plurality of portions, the curved portion (a portion having a curved surface) of the internal space, in which the direction of a cooling channel is altered, can be easily formed, as illustrated in FIG. 4C and FIG. 5A. However, the space formation member 120 is not limited to being formed through assembly after the division thereof, and may be formed of a single member having the second space 125 formed therein, as illustrated in FIGS. 5D through 5F and FIGS. 6A through 6D.

The space formation member 120 may be formed by a conventional manufacturing process (for example, cutting, casting, or the like), AF processing (DMF processing, multilayer laser cladding processing, or the like), or any combination of processing processes thereof, similarly to the body part 110. In addition, as the second space 125 may be exposed to the outside of separation members 121 and 122 forming the space formation member 120 as illustrated in FIG. 4C, the second space 125 of separation members 121 and 122 can be formed by machining, such as cutting (including electro-discharge machining). However, the second space 125 may also be formed simultaneously with the body of the space formation member 120 by casting or AF processing. In the case of forming of the second space 125 through cutting, a low passage resistance due to a smooth surface and less corrosion can be achieved.

In this manner, the second space 125 formed in the space formation member 120 may have a curved surface portion communicating with the first space 111, whereby an internal space having a complex configuration, as well as simple configuration can be easily formed in the metal product 100.

In addition, when the space formation member 120 is made of a material identical to that of the body part 110, or that has corrosion resistance higher than the body part 110, corrosion defects caused by the mounting of the space formation member 120 on the body part 110 can be solved. That is, in the case of manufacturing a mold by using a SLS technique and a SLM technique according to the related art, a corrosion rate of the manufactured cooling channel is rapid due to the rough surface thereof. Furthermore, in the case of using additional low-melting point metal powder in order to form a cooling channel through the DMF and multilayer laser cladding techniques, the low-melting point metal remains in the cooling channel without being completely removed, thereby causing corrosion (in particular, galvanic corrosion). However, according to an embodiment of the present invention, since the material of the space formation member 120 is identical to that of the body part 110 or has excellent corrosion resistance, corrosion problems can be solved.

The finishing part 130 forms the exterior of the metal product 100 by covering the space formation member 120 mounted on the body part 110.

The finishing part 130 may be metallically bonded to the body part 110 and the space formation member 120 in such a manner that the space formation member 120 is not detached from the body part 110 and the finishing part 130 is entirely coupled to the space formation member 120.

That is, when the finishing part 130 is metallically bonded to the body part 110 and the space formation member 120, the space formation member 120 is entirely coupled to the finishing part 130 to thereby prevent the detachment of the space formation member 120 and allow for an efficient thermal transfer between a coolant flowing through the second space 125 and the surface of the finishing part 130.

In this case, the mounting groove 112 of the body part 110 may be formed to have a minimum depth such that the space formation member 120 can be positioned therein. Therefore, the majority of the area of the space formation member 120 is exposed outwardly of the mounting groove 112 and entirely coupled to the finishing part 130, thereby leading to maximized cooling efficiency. Meanwhile, in the case of forming a cooling channel by using a copper tube according to the related art, as illustrated in FIGS. 3A through 3D, since the mounting groove 3 for mounting the copper tube 4 needs to have a depth corresponding to the radius of the copper tube 4, the lower portion of the copper tube 4 installed in the mounting groove 3, that is, a half area of the cross section of the copper tube 4 is separated from the metal product without being bonded thereto, whereby cooling efficiency is reduced. However, according to an embodiment of the present invention, the depth of the mounting groove 112 can be minimized to thereby allow for the obtainment of superior cooling efficiency, as compared to the related art. In particular, according to the related art, as illustrated in FIGS. 3A through 3D, in order to form the 3D channel having different heights, the processing of the mounting groove 3 for mounting the copper tube is difficult, or the formation of the mounting groove 3 and the mounting of the copper tube 4 needs to be continuously repeated. However, according to an embodiment of the present invention, since the channel is separately formed in such a manner that a rectilinear portion can be formed by gun drilling, and an overhang portion and/or a curvature portion adjacent to the surface of the metal product (a mold) 100 are/is formed as the space formation member 120, the installing of the channel can be facilitated.

In addition, when an internal space (a cooling channel) is formed by using a copper tube according to the related art, as illustrated in FIGS. 3A through 3D, a cross section at the curved or bent portion of the copper tube 4 is not uniform, and therefore a turbulence in a coolant flow within the copper tube 4 can occur. However, according to an embodiment of the present invention, the cross section of the internal space is uniformly formed, whereby the direction of a coolant can be smoothly altered along a curved surface of the internal space. As a result, a turbulence or congestion is minimized in the coolant flow. Further, according to an embodiment of the present invention, the space formation member 120 is stably mounted in the mounting groove 112, whereby metallic bonding between the space formation member 120 and the finishing part 130 can be stably undertaken.

In the meantime, in order to achieve the forgoing metallic bonding, a DMF technique or multilayer laser cladding technique may be used. In this case, the DMF technique or the multilayer laser cladding technique may also be advantageously used in the event that the surfaces of the space formation member 120 and/or the body part 110 have a 3D curved shape.

However, in the event that the surfaces of the space formation member 120 and/or the body part 110, provided to have the finishing part formed thereon, have a planar 2D shape, a SLS or SLM technique can also be used in order to form the finishing part 130.

In addition to the AF technique as described above, a well-known method of welding, plating, depositing, thermal spraying, or the like, can be used, in order to form the finishing part 130.

Moreover, before the formation of the finishing part 130, the space formation member 120 may be mounted in the mounting groove 112 and continuously fixed thereto through a method, such as DMF, multilayer laser cladding, welding, or the like. When the space formation member 120 is formed of the at least two separation members 121 and 122, in order to stably maintain the shape of the second space (cooling channel) 125 during the formation of the finishing part 130, a boundary part L may be bonded to the space formation member 120 through DMF, multilayer laser cladding, welding, or the like, before or after mounting the space formation member 120 in the mounting groove 112.

After the formation of the finishing part 130, a post machining process for obtaining the smooth surface of the finishing part 130 may be added.

FIGS. 4A through 4F illustrate that the cooling channel formed in the metal product 100 has a relatively simple configuration and FIGS. 5D through 5F and FIGS. 6A through 6C illustrate that the single space formation member 120 is provided on the top portion of the metal product 100. However, the configuration of the cooling channel may be varied, the space formation member 120 may be provided in plural, and the finishing part 130 covering the space formation member 120 may be provided singularly or in plural. Further, the space formation member 120 may be mounted on various locations, such as a bottom portion, a side portion, or a top portion of the metal product 100 thereof.

Next, a metal product 100 having an internal space formed therein according to another embodiment of the present invention will be explained with reference to FIGS. 5A through 5D.

FIGS. 5A and 5C illustrate, in front view and cross-section, a metal product 100 including the space formation member 120 formed of the two separation members 121 and 122 (FIG. 5B), similarly to the metal product 100 illustrated in FIGS. 4A through 4F, while FIGS. 5D and 5F illustrate, in front view and cross-section, a metal product 100 including the space formation member 120 formed as a single member (FIG. 5E).

As illustrated in FIGS. 5A through 5C, the space formation member 120 may include a plurality of the separation members 121 and 122, and may be mounted in the mounting groove 112 formed in the body 110 while having the plurality of the separation members 121 and 122 coupled thereto. Thereafter, the finishing part 130 may be formed through a DMF technique, a multilayer laser cladding technique, or the like, to thereby complete the 3D exterior of the metal product 100. In this case, the first space 111 and the second space 125 have the same cross-sectional shape and cross-sectional area and are in communication with each other, to thereby form the cooling channel which can allow for passage resistance to be minimized, such that efficient cooling can be performed even on the surface of the metal product corresponding to the finishing part 130.

Alternatively, as illustrated in FIGS. 5D through 5F, the space formation member 120 can be formed as a single member and have the second space 125 formed in the lower side thereof while being mounted in the mounting groove 112, the second space 125 being in communication with the first space 111. In this manner, in the case of FIGS. 5D through 5F, an overhang structure having an empty space formed therebelow can be achieved, whereby a cooling channel having the overhang structure which is difficult to be implemented by a DMF or multilayer laser cladding technique can be advantageously formed.

In addition, in the case of FIGS. 5D through 5F, since the second space 125 is entirely exposed from a side of the space formation member 120, the second space 125 can be easily formed in the space formation member 120 through cutting. Moreover, in the case of the body part 110, the rectilinear portion of the first space 111 is formed through cutting, such as drilling, and the first space 111 having a shape corresponding to that of the second space 125 is formed though a finishing cutting operation.

In this manner, the finishing part 130 covers the space formation member 120, such that the cooling channel can be configured to allow the metal product 100 to have a uniform surface temperature and therefore efficient surface cooling can be achieved. In particular, metallic bonding between the majority of the space formation member 120 exposed from the body part 110 and the finishing part 130 is attained by minimizing the depth of the mounting groove 112, allowing for maximized cooling efficiency.

The metal product 100 having an internal space formed therein according to another embodiment of the present invention will be explained with reference to FIGS. 6A through 6D.

In the case of FIGS. 6A through 6D, the space formation member 120 is formed as a single member and an overhang structure having an empty space formed therebelow may be implemented as the space formation member 120, similar to FIGS. 5D through 5F.

Figure 6D:
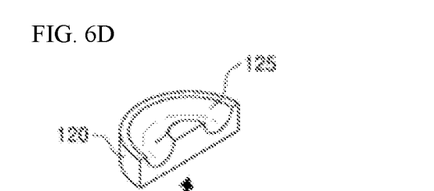
FIG. 6D is a perspective view illustrating a space-formation member of the metal product.

As illustrated in detail in FIGS. 6B and 6D, a rectilinear portion of the first space 111 may be formed in the body 110 through drilling or the like, and a portion of the first space 111 connected to the mounting groove 112 and the second space 125 may be formed through cutting. Thereafter, the space formation member 120 is mounted in the mounting groove 112 such that the second space 125 of the space formation member 120 and the first space 111 of the body part 110 can be connected. In this case, the first space 111 may form approximately a half of a U-shaped portion in which the direction of a channel is altered, and the second space 125 may form the remaining half of the U-shaped portion. Accordingly, the first space 111 and the second space 125 wholly forms an internal space connected through the body part 110 and the space formation member 120.

In addition, in the case of the metal product 100 having an internal space formed therein as illustrated in FIGS. 6A through 6D, since the space formation member 120 has an overhang structure, the finishing part 130 can be formed on the top portion of the space formation member 120 by using a DMF or a multilayer laser cladding technique. In addition to the AF technique, the finishing part 130 may also be formed by a method such as welding, plating, depositing, thermal spraying, or the like.

Next, the metal product 100 having an internal space formed therein according to another embodiment of the present invention will be explained with reference to FIGS. 7A through 7D.

FIGS. 7A and 7B illustrate a state in which the space formation member 120 is exposed outwardly of the mounting groove 112, similarly to FIGS. 4A through 4F and FIGS. 5A through 5F, and FIGS. 7C and 7D, illustrate a state in which the space formation member 120 completely sinks to be installed in the mounting groove 112.

In the case of FIGS. 7A and 7B, the finishing part 130, and the body part 110 and the space formation member 120 are mainly metallically bonded to each other, such that a thermal transfer between a coolant flowing through the second space 125 of the space formation member 120 and the surface of the metal product 100 corresponding to the finishing part 130 can be increased, whereby a uniform cooling temperature at the surface of metal product can be achieved.

However, in a portion of the metal product, in which cooling is not required or the direction of a cooling channel only needs to be diverted (for example, a portion apart from the surface of the metal product), the space formation member 120 can be mounted in the state of being sunk in the mounting groove 112, similarly to FIGS. 7C and 7D. In this situation, in a case in which an upper surface of the space formation member 120 and an upper surface of the body part 110 are on the same plane, the finishing may be formed by an SLS technique, an SLM technique, or the like, as well as a DMF or multilayer laser cladding technique.

Finally, FIGS. 8A and 8B illustrate the metal product 100 having an internal space formed therein, the metal product 100 including the space formation member 120 being provided in plural.

As illustrated in FIGS. 8A and 8B, in the case in which the internal space is formed to have a complex configuration, the first space 111 may be formed in the body part 110 through drilling to meet an inlet 111a, and the plurality of space formation members 120 respectively having the second space 125 corresponding to the first space 111 may be mounted on the body part 110 (FIG. 8A), and then the finishing part 130 covering the space formation member 120 may be formed (FIG. 8B).

However, the shape of the metal product illustrated in FIGS. 8A and 8B is merely provided by way of example, and the shape, the number, and the location of the space formation members 120 may be variously modified according to the configuration of the internal space (cooling channel) for cooling the surface of the metal product 100.

Next, referring to FIGS. 4A through 4F, a method (S100) of manufacturing the metal product 100 having an internal space formed therein (a mold or various kinds of metal products requiring cooling) according to another embodiment of the present invention will be explained.

The method (S100) of manufacturing the metal product 100 having an internal space formed therein comprises preparing (S120) the body part 110 having the first space 111 formed therein, preparing (S130) the space formation member 120 made of a metallic material and having the second space 125 formed therein, mounting (S140) the space formation member 120 on the body part 110 such that the first space 111 and the second space 125 are in communication with each other, and forming (S150) the finishing part 130 corresponding to the exterior of the metal product 100 by covering the space formation member 120. The method (S100) may further comprise trimming or post machining (S160) for obtaining the smooth surface of the finishing part 130, after the forming of the finishing part 130.

In this case, the order of the operations of preparing (S120) the body part 110 and the preparing (S130) the space formation member 120 may be changed.

Figure 4A:
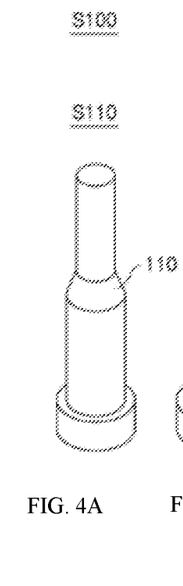
FIGS. 4A through 4F are schematic perspective views sequentially illustrating a process of manufacturing a metal product according to an embodiment of the present invention.
Figures 4B, 4C:
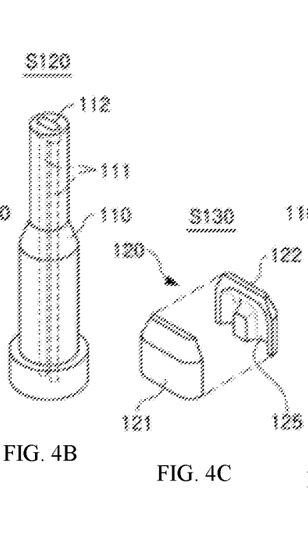

First, the preparing (S120) of the body part 110 includes forming (S110) the exterior of the body part 110 by using a conventional manufacturing process (for example, cutting, casting, or the like), AF processing (DMF processing, multilayer laser cladding processing, or the like), or any combination of processing processes thereof (FIG. 4A). In this state, the first space 111 and the mounting groove 112 may be formed in the body part 110 through cutting, drilling, EDM (electrical discharge machining), or the like (FIG. 4B).

Meanwhile, in the metal product 100, since an overhang structure or a portion in which the direction of a channel is altered may be formed as the space formation member 120 as previously described, the shape of the body part 110 can be very simple and easily manufactured by using an AF technique, such as a DMF or multilayer laser cladding technique. In this case, since the body part 110 does not have the overhang structure as mentioned, the body part 110 having the first space 111 and the mounting groove 112 also formed therein, can be easily manufactured by using an AF technique.

In addition, in the preparing (S130) of the space formation member 120, the exterior of the space formation member 120 can be formed by using a conventional manufacturing process (for example, cutting, casting, or the like), AF processing (DMF processing, multilayer laser cladding processing, or the like), or any combination of processing processes thereof, and then the second space 125 is formed through additional cutting process (FIG. 4C). However, the space formation member 120 having the exterior and the second space 125 formed therein may be manufactured through a single process, for example, casting or AF processing (DMF processing, multilayer laser cladding, or the like).

Figures 4D, 4E:
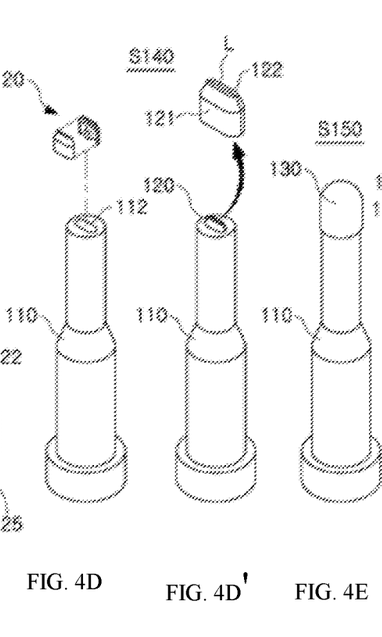

Thereafter, the space formation member 120 is mounted in the mounting groove 112 of the body part 110 (S140, FIG. 4D). In this case, when the space formation member 120 is formed of the plurality of separation members 121 and 122, in order to stably maintain the shape of the second space 125 during the formation of the finishing part 130, bonding (FIG. 4D') the boundary part L of the separation members 121 and 122 to the space formation member 120 through DMF, multilayer laser cladding, welding, or the like, before or after mounting the space formation member 120 in the mounting groove 112, may be further performed.

In this manner, the finishing part 130 is formed in a state in which the space formation member 120 is mounted on the body part 110, to thereby form the exterior of the metal product (FIG. 4E, S150). As previously mentioned, the finishing part 130 is metallically bonded to the body part 110 and the space formation 120, and can be formed through a DMF or multilayer laser cladding technique by way of example. However, when the base on which the finishing part 130 is built up, that is, the surface of the body part 110 after mounting the space formation member 120 has a planar shape, a SLS or SLM technique may be used. A traditional method of welding, plating, depositing, thermal spraying, or the like may also be used, regardless of the shape of the finishing part 130.

Figure 4F:
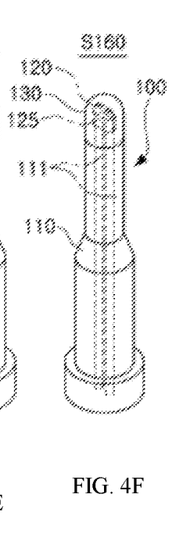

Further, as illustrated in FIG. 4F, if necessary, the metal product 100 having an internal space formed therein may be subjected to a trimming or post machining process (FIG. 4F) through finishing cutting process to be thereby finally completed.

While the present invention has been shown and described in connection with the embodiments, it will be apparent to those skilled in the art that modifications and variations can be made without departing from the spirit and scope of the invention as defined by the appended claims.

What is claimed is:

1. A metal product having an internal space formed therein, the metal product comprising:
    a body part having a first space formed therein;
    a space formation member having a second space formed therein, mounted on the body part to be communicated with the first space of body part to form the internal space therein; and
    a finishing part forming an exterior by covering the space formation member in a state in which the space formation member is mounted on the body part;
    wherein the body part includes a mounting groove having the space formation member mounted therein, and the space formation member has only a part thereof mounted in the mounting groove and a remaining part thereof exposed outwardly of the body part,
    wherein the body part and the finishing part form an exterior of the metal product, the space formation member is not exposed to an external surface of the body part and the finishing part, and the finishing part is built up to be metallically bonded to the body part and the space formation member.

2. The metal product of claim 1, wherein the space formation member is made as a single member having the second space formed therein.

3. The metal product of claim 1, wherein the space formation member is formed by coupling two or more separation members, and has the second space formed therein by the coupling of the more than two separation members.

4. The metal product of claim 1, wherein the space formation member has the second space formed in a lower portion thereof in communication with the first space of body part to form the internal space, to thereby form an overhang structure having an empty space formed therebelow.

5. The metal product of claim 1, wherein the metal product is a mold or a variety of metal products requiring cooling, the space formation member is made of a metallic material, and the first space and the second space are a cooling channel.

6. The metal product of claim 5, wherein the space formation member forms a curvature portion in which a direction of the cooling channel is altered, or an overhang portion having an empty space formed in a lower side in the cooling channel.

7. The metal product of claim 1, wherein the space formation member is made of a material identical to that of the body part or a material having corrosion resistance higher than the body part.

8. The metal product of claim 1, wherein the finishing part is formed by at least one of a direct metal fabrication (DMF) technique, a multilayer laser cladding technique, a selective laser sintering (SLS) technique, and a selective laser melting (SLM) technique.

9. A metal product having an internal space formed therein, the metal product comprising:
   a body part having a first space formed therein;
   a space formation member having a second space formed therein, mounted on the body part to be communicated with the first space of body part to form the internal space therein; and
   a finishing part forming an exterior by covering the space formation member in a state in which the space formation member is mounted on the body part;
   wherein the body part includes a mounting groove having the space formation member mounted therein, and the space formation member is not exposed outwardly of the mounting groove,
   wherein the body part and the finishing part form an exterior of the metal product, the space formation member is not exposed to an external surface of the body part and the finishing part, and the finishing part is built up to be metallically bonded to the body part and the space formation member.

10. The metal product of claim 9, wherein the space formation member is made as a single member having the second space formed therein.

11. The metal product of claim 9, wherein the space formation member is formed by coupling two or more separation members, and has the second space formed therein by the coupling of the more than two separation members.

12. The metal product of claim 9, wherein the space formation member has the second space formed in a lower portion thereof in communication with the first space of body part to form the internal space, to thereby form an overhang structure having an empty space formed therebelow.

13. The metal product of claim 9, wherein the metal product is a mold or a variety of metal products requiring cooling, the space formation member is made of a metallic material, and the first space and the second space are a cooling channel.

14. The metal product of claim 13, wherein the space formation member forms a curvature portion in which a direction of the cooling channel is altered, or an overhang portion having an empty space formed in a lower side in the cooling channel.

15. The metal product of claim 9, wherein the space formation member is made of a material identical to that of the body part or a material having corrosion resistance higher than the body part.

16. The metal product of claim 9, wherein the finishing part is formed by at least one of a direct metal fabrication (DMF) technique, a multilayer laser cladding technique, a selective laser sintering (SLS) technique and a selective laser melting (SLM) technique.

* * * * *